United States Patent [19]

Tverskoi et al.

[11] 4,248,108
[45] Feb. 3, 1981

[54] LATHE

[76] Inventors: David N. Tverskoi, ulitsa Pushkina, 17/25, kv. 184; Alexandr G. Kashirsky, ulitsa Shelkovichnaya, 184, kv. 73; Jury N. Sulie, ulitsa Sovetskaya, 63, kv. 9; Dmitry N. Trofimov, ulitsa Bolshaya Sadovaya, 54, kv. 148, all of Saratov, U.S.S.R.

[21] Appl. No.: 49,781

[22] Filed: Jun. 18, 1979

[30] Foreign Application Priority Data

Aug. 8, 1978 [SU] U.S.S.R. .............................. 2640256

[51] Int. Cl.$^3$ .......................... B23B 3/00; B23B 29/00
[52] U.S. Cl. ..................................... 82/2 R; 82/36 A
[58] Field of Search .............. 82/2 R, 2 A, 36 A, 2.5; 74/813 R, 813 C

[56] References Cited

U.S. PATENT DOCUMENTS

| 3,665,789 | 5/1972 | Fisher | 82/36 A |
|---|---|---|---|
| 3,717,912 | 2/1973 | Lahm | 82/36 A |
| 4,015,491 | 4/1977 | Pefer | 82/2 R |
| 4,055,095 | 10/1977 | Gramespacher | 82/36 A |

FOREIGN PATENT DOCUMENTS 403444 6/1966 Switzerland .......................... 82/36 A Primary Examiner—Harrison L. Hinson
Attorney, Agent, or Firm—Steinberg & Raskin

[57] ABSTRACT

A lathe, wherein its turret kinematically associated with a drive for its indexing, carries on its face a plurality of tool-holders and has a plurality of teeth on the peripheral cylindrical portion thereof, the number of said teeth corresponding to the number of the tool-holders, said teeth being adapted to interact with the actuating member of the mechanism for turret fixing in position. The turret indexing drive is essentially a reversible electric motor, and the turret fixing mechanism comprises a solenoid whose armature is associated, through a linkage, with the actuating member; provision is also made for a pickup adapted to monitor the turret teeth travelling through the zone of fixing, said pickup being electrically connected, through a switch, to the solenoid and motor control circuits.

3 Claims, 7 Drawing Figures

LATHE

The present invention relates to the trade of machine-tool building and has particular reference to lathes.

This invention is most advantageously applied in numerically controlled automatic bar machines of the turret type.

One prior-art turret lathe is known to comprise a turret mounted on the bed traversably with respect thereto, said turret carrying the cutting tool and being linked to the indexing head to receive swivelling (indexing) motion therefrom. The indexing head has circumferential slots the number of which equals that of the turret cutting indexed positions (stations), a V-block being adapted to engage said slots, said V-block being linked through an articulated joint to the slide-block which in turn is associated with the indexing motion drive hydraulic cylinder for the turret to be indexed and fixed in the indexed position. The turret is indexed to a next cutting position consecutively per double stroke of the hydraulic cylinder.

However, the turret of said lathe fails to be set to any next cutting position along a shortest possible pathway as said turret is brought into a next cutting position strictly consecutively by being rotated in one direction only, which prolongs the time of the working cycle.

In addition, one prior-art indexing head is known to be made integral with rotary table whose cylindrical portion has a number of teeth the depth of which is progressively increased (as in the teeth of a ratchet wheel), and a pitch is equal to the angle of the table swivel. The table receives rotary motion from an air cylinder whose rod is linked to the toothed rack getting in mesh with the gear wheel coupled to the table. The mechanism of fixing said indexing head incorporates a pawl adapted to engage the teeth of the rotary table and set on a shaft secured on a stationary base (cf., e.g. Application No. 50-1113, cl. B23Q 17/04 filed in Japan and published in Russian in the journal "Izobreteniya za rubezhom" (Foreign Inventions), No. 7 1975).

The aforementioned indexing head cannot, however, be set to any fixed position for a shortest possible time (that is, along a shortest pathway), as the head is fixed consecutively at each of the teeth with the table rotating in one direction only, which involves an increase in the machining time and, thus, a reduced production output.

It is an object of the present invention to provide a lathe, wherein the mechanism for fixing the turret in position and the drive for turret indexing be so interlinked as to enable the turret to be set to any next preselected position along a shortest possible pathway.

It is another object of the present invention to reduce the machining time per cycle and hence to increase labour productivity.

In keeping with said and other objects proposed herein is a lathe, wherein its turret kinematically linked with a drive for its being indexed, carries on the face thereof a number of tool-holders and has teeth on its peripheral cylindrical portion, the number of said teeth corresponding to the number of the tool-holders, said teeth being adapted to interact with the actuating member of the turret position fixing mechanism, characterized in that the drive for indexing the turret is in fact a reversible electric motor, and the fixing mechanism comprises a solenoid whose armature is associated, through a linkage, with the actuating member, and in that provision is made for a pickup for monitoring the travelling of the teeth through the zone of fixing, said pickup being electrically connected, through a switch, to the control circuits of the solenoid and electric motor.

It is expedient that the pickup for monitoring the travelling of the teeth through the zone of fixing be so arranged as to directly interact with the surface of the turret teeth.

Such an arrangement of the pickup for monitoring the teeth travelling through the zone of fixing simplifies the construction and adds to reliability of the turret fixing.

It is also reasonable that in a lathe, wherein a kinematic chain linking the electric motor to the turret incorporates a reduction unit, the shaft of said reduction unit would carry a cam having a number of lobes corresponding to the turret teeth, and the pickup for monitoring the teeth travelling through the zone of fixing would interact with said cam lobes.

Provision of a cam with lobes corresponding to the turret teeth adapted to interact with the pickup for monitoring the the teeth traveling through the zone of fixing is expedient on account of an inadequate space in the turret zone.

The lathe according to the present invention is capable of higher productivity due to a reduced time spent for setting the turret to any cutting position as such setting is carried out along a shortest possible pathway.

Given below is a detailed description of a specific embodiment of the present invention to be considered with reference to the accompanying drawings, wherein.

Figure 1:
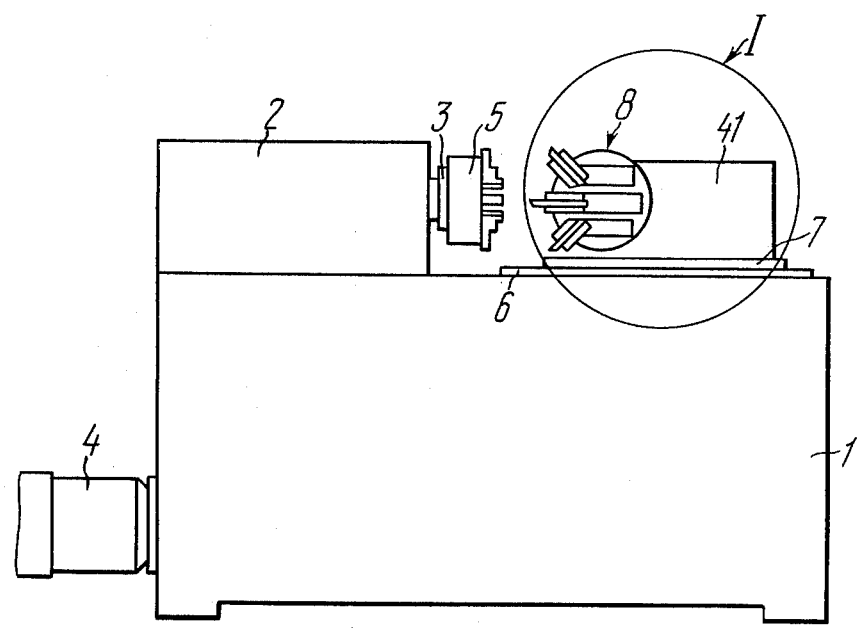
FIG. 1 is a diagrammatic front view of a lathe, according to the invention.
Figure 2:
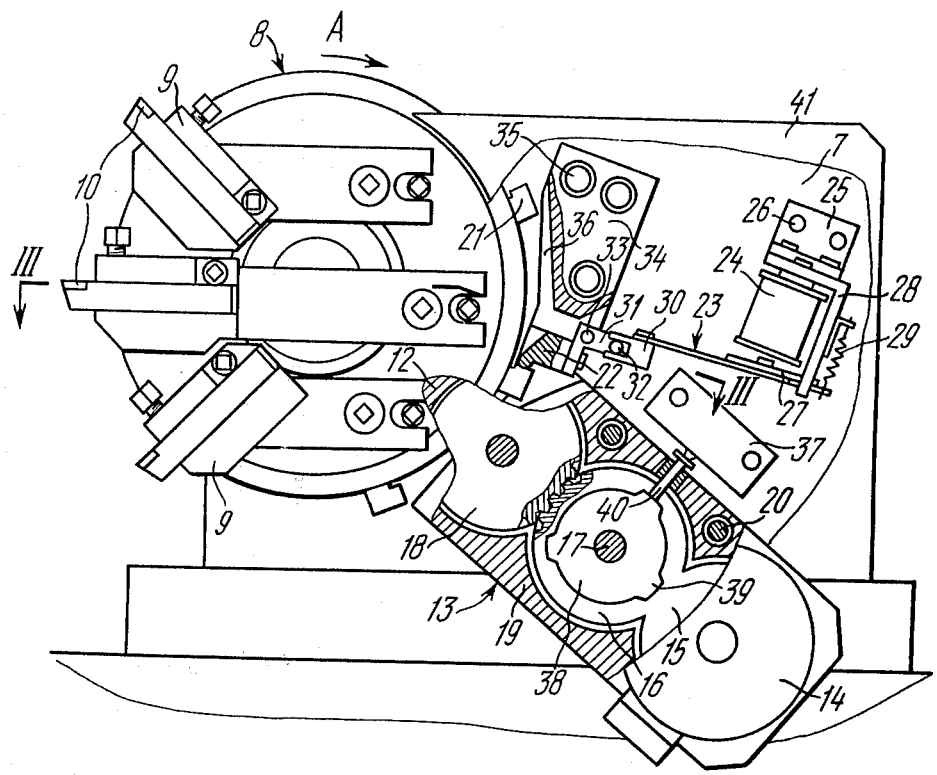
FIG. 2 is a scaled-up fragmentarily cutaway view of the unit I in FIG. 1.
Figure 3:
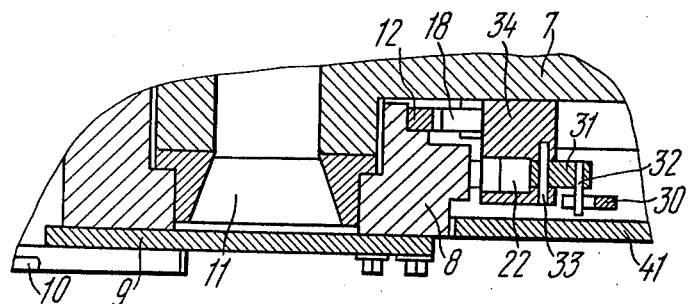
FIG. 3 is a section taken along the III—III in FIG. 2.
Figure 4:
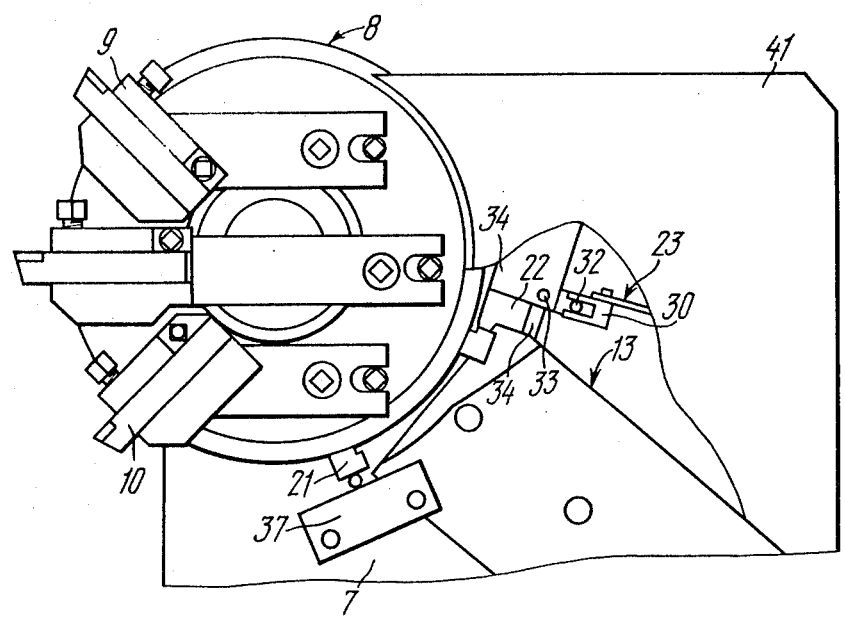
FIG. 4 is a turret and a pickup for monitoring the teeth travelling through the zone of fixing, while contacting the tooth surface.

The herein-proposed lathe comprises a bed 1 (FIG. 1) which mounts a headstock 2 with a spindle 3 having a drive 4 for its rotation. The spindle 3 carries a chuck 5 for holding the bar stock being machined (not shown). Ways 6 of the bed 1 mount a saddle 7 carrying a turret 8. The turret 8 carries on its face a number of tool-holders 9 (FIG. 2) for cutting tools 10 to clamp therein. the turret 8 is mounted on a shaft 11 (FIG. 3) which is secured in the saddle 7.

The turret 8 has a gear 12 engaged, through a reduction unit 13 (FIG. 2), with a motor 14 for the turret 8 to swivel in order to set the tools 10 to the cutting position. The reduction unit 13 incorporates a gear 15 set on the shaft (not shown) of the motor 14 and adapted to get in mesh with a gear 16 set on a countershaft 17, and a gear 18 adapted to get in mesh with the gear 12; A housing 19 of the reduction unit 13 is held to the saddle 7 with screws 20. A peripheral cylindrical portion of the turret 8 has teeth 21 (FIG. 2) the number of which corresponds to the number of the toll-holders 9, said teeth being adapted to interact with an actuating member 22 of a mechanism 23 for fixing the turret in position. The mechanism 23 for turret fixing comprises a solenoid 24 made fast on a bracket 25 which is held to the saddle 7 by screws 26. An armature 27 of the solenoid 24 is linked to its magnetic yoke 28 through a spring 29. A fork 30 is fixed at the end of the armature 27, said fork being linked to one of the arms of a crank lever 31 through a pin 32, while the other arm of the crank lever 31 carries the actuating member 22. The crank lever 31 is mounted on a hinge pin 33 which is secured on a stop 34. The stop 34 is fastened on the saddle 7 by screws 35 and has a slot 36 for the teeth 21 to pass when the turret 8 is being indexed.

The saddle 7 carries a pickup 37 (FIG. 1) for monitoring the teeth travelling through the zone of turret fixing, i.e., the zone where the actuating member 22 is located. The pickup 37 in the given particular embodiment of the present invention is essentially a microswitch or any other pickup of a known construction suitable for the purpose. The pickup 37 is adapted to interact with the surface of the teeth 21 at the instance when one of the teeth 21 is approaching the zone of fixing.

Whenever the zone of the turret is not roomy enough to accommodate the pickup 37 for monitoring the teeth travelling through the zone of fixing, a cam 38 is to be set on the countershaft 17 (FIG. 2), said cam having lobes 39 corresponding to the teeth 21 of the turret 8. The number of the lobes 39 depends upon the ratio of the gear 12 of the turret 8 and the gear 16 on the countershaft 17.

The pickup 37 is adapted to interact with the lobes 39 through a tappet 40 which passes through a hole made in the housing 19.

The reduction unit 13 and the turret fixing mechanism 23 are protected by a cover 41.

Figure 5:
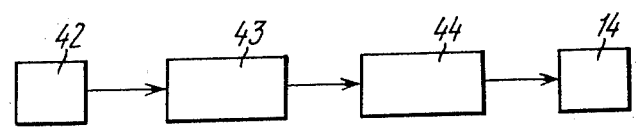
FIG. 5 is a block diagram of the motor control.

The operation of the lathe is controlled by a program-carrying medium 42 (FIG. 5), wherefrom data are fed to a numerical control system 43 which delivers control singles to an automatic relay control unit 44 controlling the motor 14.

The automatic relay control unit 44 comprises a control circuit of the motor 14 and the solenoid 24, said circuit consisting of auxiliary relays 45 (FIG. 6) and 46 controlled by normally open contacts 47 and 48 (similar contacts 43 (FIG. 5) being provided in the numerical control system), as well as a switch 49 (FIG. 6) which is controlled by a contact 50 of the relay 45 and a contact 51 of the relay 46 to reverse the motor 14.

The circuit of the switch 49 incorporates also a normally closed contact 52 of a relay 53, whereas the control circuit of the solenoid 24 and the relay 53 incorporates the pickup 37 for monitoring the teeth travelling through the zone of fixing, the normally open contacts 50, 51 and 54 of the respective relays 45, 46 and 53, and a normally closed contact 55 of the relay 46.

Figure 6:
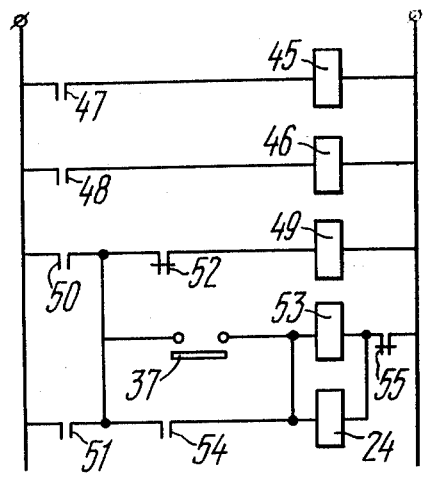
FIG. 6 is an electric circuit diagram of the solenoid and motor control.
Figure 7:
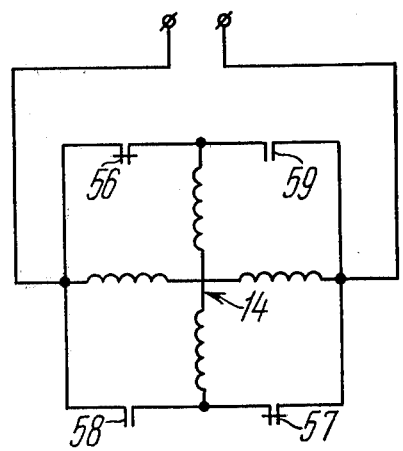
FIG. 7 is an electric connection diagram of the motor.

The control circuit of the motor 14 (FIG. 7) includes normally closed contacts 56 and 57 and normally open contacts 58 and 59 of the switch 49 (FIG. 6).

The lathe proposed in the present invention operates as follows.

All the lathe control data are put down in the program-carrying medium 42 and entered into the numerical control system 43 which effects control over the entire machining cycle, viz., rotation of the spindle 3, traversing the saddle 7 with the turret 8, changing the cutting tools 10 in the working position, etc.

The turret 8 can be set to working position by rotating both closkwise and counterclockwise (as seen in the drawing) in any sequence and along a shortest possible pathway.

With the lathe operating the motor 14 is continuously energized through the contacts 56 and 57 of the switch 49 and transmits its torque through the reduction unit 13 to the gear 12, thus keeping the tooth 21 constantly forced against the actuating member 22 which thrusts against the stop 34. The pickup 37 interacts constantly either with the surface of the teeth 21 or with the lobe 39 of the cam 38.

The turret 8 is set to a next working station, when rotating clockwise in the direction of arrow "A" (as in the drawing), in the following way: a control signal is delivered from the program-carrying medium 42 to the numerical control system 43, in response to which the contact 48 in the automatic relay control unit 44 is closed to energize the relay 46, with the result that the relay contact 51 closes and the contact 55 opens. This actuates the switch 49 and deenergizes the relay 53 and the solenoid 24. The contacts 56 and 57 of the switch 49 out in the motor windings are deenergized, and the contacts 58 and 59 are energized to reverse the motor 14. Thus, the turret 8 starts rotating clockwise (as in the drawing) in the direction of arrow "A". As a result the teeth 21 pass through the zone of turret fixing in the slot 36 of the stop 34 and cause the actuating member 22 to rotate about the hinge pin 33, while overcoming the opposition of the spring 29 when the armature 27 is being turned. Each of the teeth 21 interacts with the pickup 37 and, after said tooth has passed the zone of turret fixing the actuating member 22 is actuated by the spring 29 through a linkage to force against the stop 34.

Once a number of the teeth 21 predetermined by the program-carrying medium 42 have passed through the zone of turret fixing, the numerical control system 43 delivers a control signal at which the contact 48 in the unit 44 opens to deenergize the relay 46. This relay in turn deenergizes the switch 49 with its contact 51, whereby the contacts 56 and 57 of said switch close, and the contacts 58 and 59 thereof open to reverse the motor 14. The result is that the turret starts rotating counter-clockwise (as in the drawing) until the predetermined tooth 21 thrusts against the actuating member 22, thus fixing the turret 8 at the stop 34.

To set the turret 8 to working station by being rotated counterclockwise (as in the drawing), a control signal is delivered by the numerical control system 43 at which the contact 47 in the unit 44 is closed, whereby the relay 45 is energized and with its contact 50 energizes the switch 49 whose contacts 56 and 57 open and contacts 58 and 59 close to reverse the motor 14, whereupon the turret 8 begins rotating clockwise (as in the drawing). The tooth 21 disengages from the actuating member 22 until the lobe 39 of the cam 38 (or the surface of the tooth 21) gets out of interaction with the pickup 37. Thus, the pickup 37 operates to energize the relay 53, whereupon its contact 52 turns out the switch 49 and the contact 54 energizes the solenoid 24. The solenoid armature 27 overcomes the opposition of the spring 29 to get attracted to the core (not shown) and, while acting through the yoke 30 which engages the pin 32 to turn the crank lever 31 along with the actuating member 22 which is kept in the swung-aside position. Upon turning out the switch 49 its contacts 56 and 57 close and the contacts 58 and 59 open, thus reversing the motor 14. As a result the turret starts rotating counter-clockwise (as in the drawing), and the teeth 21 pass through the zone of turret fixing under the actuating member 22 which is kept in the swung-aside position by the solenoid 24. Once a number of the teeth 21 predetermined by the program-carrying medium 42 have passed through the zone of turret fixing, the contact 47 in the unit 44 is opened at a control signal delivered by the numerical control system 43, with the result that the relay 45 gets deenergized and with its contact 50 deenergizes the relay 53 and the solenoid 24. Thereupon the spring 29 causes, through a linkage, the actuating member 22 to force against the stop 34, and the predetermined tooth 21 rests against the actuating member 22, and the turret 8 gets fixed at the stop 34.

The invention proposed herein is carried into effect in a numerically controlled automatic bar machine, wherein the turret provided with a number of peripheral teeth adapted to get fixed at a positive stop, affords very fine accuracy of its positioning and high fixing rigidity. A possibility of setting such a turret to a next working station in any sequence and along a shortest possible pathway has enabled the production output of the lathe to be increased due to a reduced handling time lost for setting the tool to the cutting position.

What we claim is:

1. A lathe, comprising: a bed; a headstock mounted on said bed; a saddle mounted on said bed; means for traversing said saddle; a turret mounted on said saddle; a plurality of tool-holders mounted on the face of said turret; a plurality of teeth provided on the peripheral cylindrical portion of said turret, the number of said teeth corresponding to the number of said tool-holders; a reversible electric motor kinematically associated with said turret for its being indexed in order to set one of said tool-holders to the cutting position; an electric circuit to control said electric motor; a mechanism for fixing said turret in position, said mechanism being mounted on said saddle and comprising: an actuating member adapted to interact with said teeth of said turret for its being fixed in a preset position, a solenoid mounted on said saddle, an electric circuit to control said solenoid, a linkage interconnecting said actuating member to said armature of said solenoid; a pickup for monitoring the travelling of said teeth through the zone of fixing; a switch to control the sense of rotation of said electric motor; said pickup for monitoring the teeth travelling through the zone of fixing being electrically connected through said switch to said control circuits of said electric motor and said solenoid, whereby setting any of said tool-holders to the cutting position is carried out along a shortest possible pathway.

2. A lathe as claimed in claim 1, wherein the pickup for monitoring the teeth travelling through the zone of fixing is so arranged as to interact directly with the teeth surface.

3. A lathe as claimed in claim 1, wherein the kinematic chain that links the electric motor to the turret, comprises a reduction unit on the shaft of which is set a cam with lobes corresponding to the turret teeth, whereas the pickup for monitoring the teeth traveling through the zone of fixing is adapted to interact with said cam lobes.

* * * * *